United States Patent [19]

Frank

[11] Patent Number: 5,416,800
[45] Date of Patent: May 16, 1995

[54] MOBILE RADIO RECEIVER FOR A RADIO TRANSMISSION SYSTEM

[75] Inventor: Georg Frank, Nürnberg, Germany

[73] Assignee: U.S. Philips Corporation, New York, N.Y.

[21] Appl. No.: 986,328

[22] Filed: Dec. 7, 1992

[30] Foreign Application Priority Data

Dec. 7, 1991 [DE] Germany .................. 41 40 389.4

[51] Int. Cl.$^6$ ........................... H03K 7/04; H03K 9/04
[52] U.S. Cl. ...................................... 375/239; 375/316
[58] Field of Search ................... 375/23, 97, 111, 113, 375/116, 75; 370/95.3; 455/51.1, 56.1, 70, 71, 75

[56] References Cited

U.S. PATENT DOCUMENTS 5,191,598   3/1993   Backstrom et al. ................. 375/100

OTHER PUBLICATIONS

Georg Frank and Wolfgang Koch, "Anfangssynchronisation der Mobilstation im D-Netz", PKI Technische Mitteilungen Jan. 1990, pp. 43-49.

*Primary Examiner*—Stephen Chin
*Assistant Examiner*—Duane Kobayashi
*Attorney, Agent, or Firm*—Leroy Eason

[57] ABSTRACT

A mobile radio receiver for a digital radio transmission system includes a recognition arrangement (6) for searching a received digital signal for pulses (i) of a frequency correction burst which recurs with a predetermined frequency in the digital signal and for determining the pulse positions (t). A frequency estimation arrangement (7) derives estimates of the predetermined frequency. In order to improve the initial synchronization of the mobile radio receiver with a base station, the recognition arrangement includes an averaging circuit (14) which averages with weight factors (Us) the pulse positions (t) that have been determined in successive observation intervals, the weight factors (Us) being proportional to the individual pulse heights (U). The reliability of recognition of pulses which belong a frequency correction burst is improved by providing evaluation based on the number of pulses of amplitudes above a selected threshold level during a selected interval, and further evaluation based on a phase error quality of the frequency estimates of the predetermined frequency.

7 Claims, 1 Drawing Sheet

MOBILE RADIO RECEIVER FOR A RADIO TRANSMISSION SYSTEM

BACKGROUND OF THE INVENTION

1. Field of the Invention

The invention relates to a mobile radio receiver for a radio transmission system, such receiver comprising a recognition arrangement for searching a received digital signal for pulses of a frequency correction burst contained with a predeterminable frequency in the digital signal and for determining their pulse positions, and a frequency estimation arrangement for deriving frequency estimates of the predeterminable frequency.

The invention further relates to a radio transmission system includes such a mobile radio receiver.

2. Description of the Related Art

Mobile radio receivers of this type are necessary, for example, for the Pan-European mobile radio system referenced D-network in German. In this mobile radio system, for example, speech signals are transmitted in digitized form along with other digital signals by way of a Time-Division Multiple Access method (TDMA). For this purpose, the available frequency band is subdivided into separate frequency bands and a specific number of subscriber channels are accommodated in each separate frequency band in the time-division multiplex mode. The method of accessing within a radio cell is synchronous i.e. the separate time slots are organized in frames. When a connection is set up between a base station and a mobile radio station, there is the resulting problem of initial synchronization.

In the article entitled "Anfangssynchronisation der Mobilstation im D-Netz", G. Frank, W. Koch, PKI Technische Mitteilungen 1/1990, pp. 43 to 49, a mobile radio receiver of the type mentioned in the opening paragraph is described. For initial synchronization in that arrangement a frequency correction burst (FCB) is transmitted along with other information signals between a base station and the mobile radio receiver over a broadcast control channel (BCCh). This frequency correction burst is used for fine frequency synchronization of the mobile radio receiver with the base station and for coarse synchronization with regard to the time slot position. The frequency correction burst consists of a sequence of 148 zeroes which are transformed by means of a specific modulation method, for example, GMSK modulation, into a pure sine-shaped signal shifted relative to the carrier frequency of the received digital signal by the frequency of the frequency correction burst. For detecting the frequency correction burst and thus identifying what is commonly referred to as the Broadcast Control Channel (BCCh), a recognition arrangement designated as BCCh recognition is provided. The recognition arrangement searches a signal that can be derived from the received digital signal for pulses corresponding to the frequency correction burst. This search is made in a plurality of successive observation intervals. Pulses whose position in time and whose maximum value are determined are derived from the frequency correction burst. A criterion for the actually received frequency correction burst is the average height of the detected pulses. If no frequency correction burst is found, a control unit uses a new frequency channel for a further search. If the frequency correction burst has been positively recognised, the time shift of the frequency correction burst is determined on the basis of the position in time of the maximums of the detected pulses. Subsequently, a frequency estimation arrangement is activated which derives frequency estimates of the frequency of the frequency correction burst. Then, a frequency-tracking value is determined for a local oscillator arranged in the HF section of the mobile radio receiver on the basis of a rather large number of frequency estimates of the frequency estimation arrangement.

SUMMARY OF THE INVENTION

It is an object of the invention to improve the initial synchronization of a mobile radio receiver with a base station in a transmission system of the type described above.

This object is achieved by providing the receiver with a recognition arrangement which comprises an averaging circuit for averaging with weight factors the pulse positions that have been determined in successive observation intervals, the weight factors being dependent on the individual pulse heights of the pulses.

An input signal of the recognition arrangement may, for example, be the digital signal, or a signal that can be derived from the received digital signal and is produced from normal and quadrature components of the baseband signal of the received digital signal. Such input signal is first filtered by means of a narrow bandpass filter whose bandwidth is harmonized with the maximum frequency deviation that can be expected relative to the signal based on the pulses of the frequency correction burst. Then, a value of the filtered signal is determined, as a result of which a one-timeslot-long rectangularly-shaped pulse characteristic of the frequency correction burst is produced. Such a rectangular pulse is filtered by means of a matched filter. The detection of the pulse positions is then effected by determining the maximum of the output signal of the matched filter within an observation interval. The observation interval has a length at least as long as the largest distance between two successive pulses which are based on the frequency correction burst. Determining the position of the maximum in the observation interval provides the information about the pulse position. The maximum then always characterizes the end of a frequency correction burst. The successively provided weighted averaging of the pulse positions thus determined within successive observation intervals provides a high degree of evaluation accuracy. The averaging circuit then weights the pulses determined within successive observation intervals in accordance with their individual pulse heights. An enhanced accuracy is obtained when the number of averagings is increased. The improved evaluation accuracy also provides an improved initial synchronization of the mobile radio receiver with a base station.

A possible dependence of the weight factors on the individual pulse heights to obtain a proper initial synchronization is achieved, in that the weight factors are proportional to the individual pulse heights of the pulses.

A further improved evaluation accuracy is achieved, in that the recognition arrangement comprises a first threshold former provided for taking only the pulses into account whose pulse heights exceed a predeterminable threshold.

An accurate detection of the exact pulse position is made possible, in that the recognition arrangement and/or the frequency estimation arrangement comprise(s) a bandpass filter for filtering the digital signal and a signal that can be derived from the digital signal respectively. Alternatively, a frequency mixer may be provided for the complex multiplication of the digital signal or the signal that can be derived from the digital signal by a predeterminable mixing signal, with a succeeding low-pass filter especially one with a linear phase shift as a function of frequency. The multiplication produces a frequency shift of the signal that can be derived from the received digital signal, so that instead of an expensive bandpass filtering only a low-pass filtering of the two quadrature components is necessary. Due to the highly linear phase shift as a function of frequency of the low-pass filter, i.e. a group delay which is as flat as possible, accurate detection of the exact pulse positions is possible. Especially a filter having the Bessel characteristic can be utilized as a low pass filter here.

Rectangularly-shaped pulses having a duration of a time slot, which are then used for detecting the pulse positions of the frequency correction burst, are obtained in that the recognition arrangement comprises a value generator or a squaring circuit respectively, after the bandpass and the low-pass filter respectively. The detection reliability is further enhanced by means of a squaring operation instead of a value generation. A fast and reliable detection of the pulses is effected in that the recognition arrangement comprises a first decision arrangement which is provided for determining a first decision signal taken into account when the frequency correction burst was determined, by checking whether in a predeterminable number of observation intervals at least one determined pulse exceeds a predeterminable threshold. This does increase the probability of a pulse simulation, it is true, but the probability of a pulse that is not recognised is reduced more than proportionally.

An even greater reliability with respect to the decision whether a frequency correction burst is present is achieved, in that the frequency estimation arrangement comprises means for forming a quality parameter assigned to each determined frequency estimate, which quality parameter can also be used for determining the frequency correction burst. A further enhanced reliability with the detection of the frequency correction burst is provided, in that the frequency estimation arrangement comprises a second decision arrangement for deriving a second decision signal taken into account for determining the frequency correction burst.

A possible way of computing the quality parameter is found, in that the means for forming the quality parameter comprises a reciprocator provided for determining the quality parameter from the reciprocal value of the squared distance of the estimated and the real phase variation.

A reliable determination of the frequency deviation between the local oscillator and the oscillator of the base station is made, in that the frequency estimation arrangement comprises an averaging circuit provided for forming weighted averaged estimates from a predeterminable number of frequency estimates of determined frequency correction bursts and the individually assigned quality parameters for the tracking by the oscillator of the mobile radio receiver.

Determining the frequency is improved, in that the frequency estimation arrangement comprises a second threshold former provided for taking into account only the quality parameters that exceed a predeterminable threshold.

BRIEF DESCRIPTION OF THE DRAWING

The invention will be further explained with the aid of the embodiments represented in the drawing Figures, in which.

DESCRIPTION OF THE PREFERRED EMBODIMENTS

Figure 1:
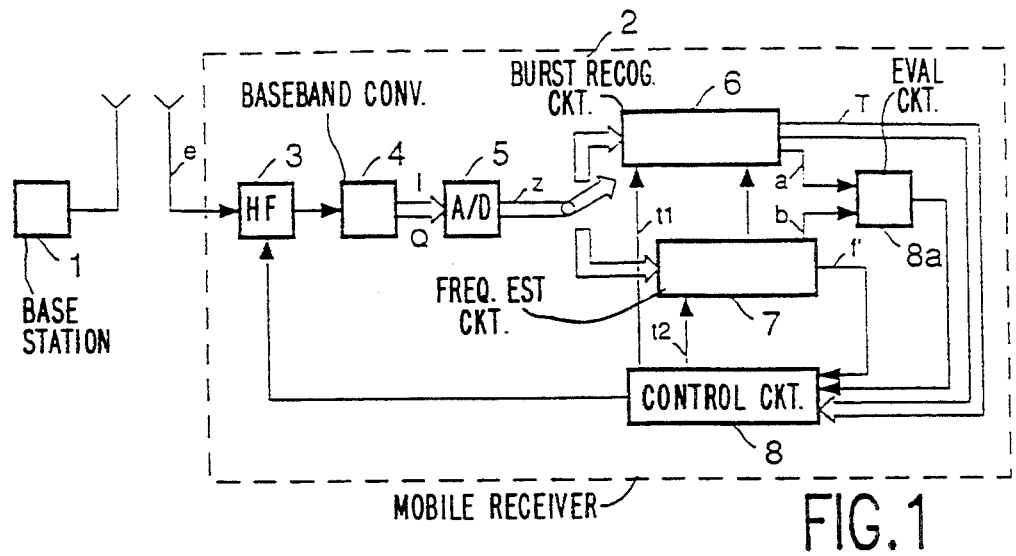
FIG. 1 shows a radio transmission system comprising a base station and a mobile radio receiver.

FIG. 1 shows a radio transmission system comprising a base station 1 and a mobile radio receiver 2. For the mobile radio receiver 2 only the basic arrangement of the circuit blocks involved in the initial synchronization is represented. Such a mobile radio receiver 2 can be used, for example, in the GSM system. A received digital signal e is first applied to a HF receiving circuit 3. By means of a baseband conversion circuit 4 for producing normal and quadrature components I, Q, a two-channel conversion to the baseband is effected as described, for example, in DE-A 39 38 126.9. The quadrature components I, Q are sampled in an analog-to-digital converter 5 and digitized. At the output of the analog-to-digital converter 5 a signal z is then available having a real component (=normal component) and an imaginary component (=quadrature component). The signal z is applied to a recognition arrangement 6 and/or a frequency estimation arrangement 7.

In the recognition arrangement 6 the digital signal z is searched for pulses of a frequency correction burst contained in the received digital signal e. The recognition arrangement produces a signal T signifying the pulse position of the frequency correction burst, and also produces a first decision signal a.

On the basis of the frequency estimates the frequency estimation arrangement 7 determines a frequency deviation signal f' as well as a second decision signal b. The decision signals a, b are applied to an evaluation arrangement 8a whose output signal drives a control arrangement 8. The output signal T of the recognition arrangement 6 and the output signal f' of the frequency estimation arrangement 7 are also applied to the control arrangement 8. The control arrangement 8 is connected to the HF section 3 for causing the frequency of a local oscillator in the HF section 3 to follow the oscillator frequency of the transmitter 1, and supplies clock signals t1, t2 to the recognition arrangement 6 and the frequency estimation arrangement 7 respectively.

The mode of operation of the mobile radio receiver 2 with respect to the basic initial synchronization between mobile radio receiver 2 and base station 1 is further described in the article entitled above-referenced PKI article. The mode of operation of the recognition arrangement 6 and the frequency estimation arrangement 7 will be further explained in conjunction with the drawing FIGS. 2 and 3.

Figure 2:
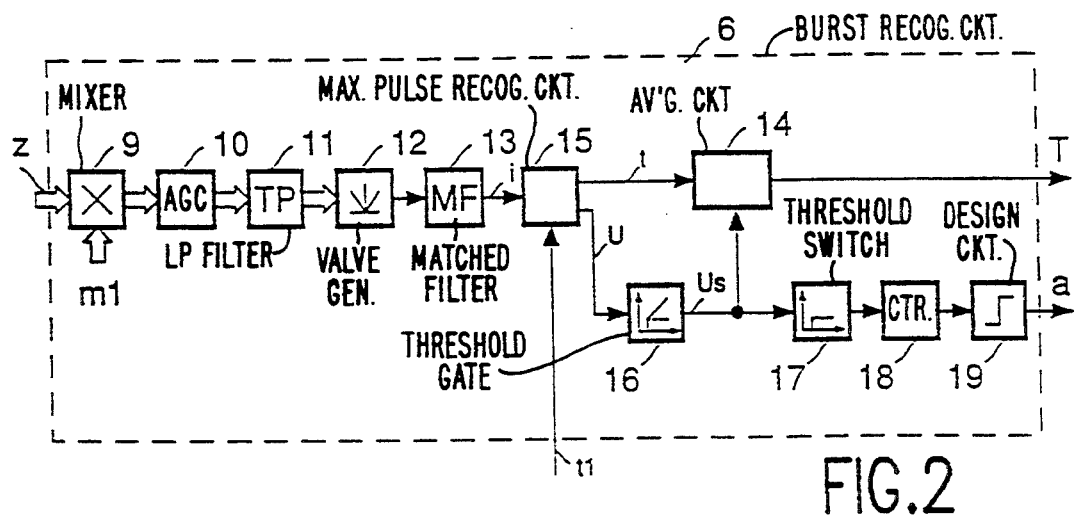
FIG. 2 shows an embodiment of a recognition arrangement of a mobile radio receiver.

FIG. 2 shows an embodiment of a recognition arrangement 6 for a mobile radio receiver 2 as it is shown in FIG. 1. The reference characters already used with respect to FIG. 1 are used here too. The recognition arrangement 6 is supplied with a signal z derived from the received digital signal. This derived signal is multiplied by a predeterminable first mixing signal m1 in a frequency mixer 9. A value generator 12 is provided after an amplitude control (AGC) arrangement 10 followed by a low-pass filter 11. The recognition arrangement 6 further includes an optimal matched filter 13 (MF). The matched filter 13 produces an output signal i, which includes the pulses in the frequency correction burst, so that in the following the reference character i is also used for referencing those pulses. The output signal i is transported to a maximum-recognition arrangement 15 for detecting pulses of maximum height. The maximum-recognition arrangement is supplied with a first clock signal t1. At the output of the maximum-recognition arrangement 15 signals t, U are available, the signal t being the positions of the pulses i in the frequency correction burst, and the signal U featuring their associated pulse height, so that in the following also the reference character t is used for identifying a pulse position, i.e. of a determined pulse in the burst, and the reference character U is used for denoting the associated pulse height. The signal t is applied to an averaging circuit 14 at whose output a signal T is present which indicates the pulse position of the frequency correction burst. The signal U is transported to a threshold gate arrangement 16 which discards the pulse heights U that fall short of a predeterminable threshold. At the output of the arrangement 16 a modified signal Us is present which is applied to the averaging circuit 14 for determining a weighted averaging. The modified signal Us is also applied to a decision arrangement 17, 18, 19 at the output of which a first decision signal (a) is produced. The decision arrangement 17, 18, 19 comprises a threshold switch 17, a succeeding counter 18 as well as a decision circuit 19.

The digital signal z is processed in FIG. 2, in essence, in the manner already described in the above-referenced PKI article, except for the processing of the signals t, U at the output of the maximum-recognition arrangement 15. By merely generating a squared value instead of a normal value of the output signal of the low-pass filter 11, the value generator 12 can enhance the detection reliability. Besides, the low-pass filter 11 advantageously has a linear phase shift as a function of frequency as this is possible, more specifically, with a low-pass filter 11 having Bessel characteristics. The maximum-recognition arrangement 15 determines a pulse position t relative to each first clock signal t1, where the period of the clock signal t1 corresponds to the length of an observation interval. The search of the maximum-recognition arrangement 15 always relates to an observation interval which is selected to be so large as to include at least a frequency correction burst. To increase the detection reliability, the maximum-recognition arrangement 15 repeats the search for the maximum pulses in a plurality of successive observation intervals.

The averaging circuit 14 averages the pulse positions t determined in successive observation intervals with weight factors. The pulses t whose pulse heights U fall short of a predetermined threshold are discarded for the weighted averaging. The pulse heights Us assigned to those of the pulses t which exceed the threshold determined by the threshold gate 16 are used as weight factors for the remaining pulses t. Thus, the following holds for the formation of the output signal T of the recognition arrangement 6, which signal signifies the pulse position of the frequency correction burst: $T = \Sigma t \cdot Us/\Sigma Us$. For deciding whether a pulse has or has not been determined to be a pulse of the frequency correction burst, the output signal Us of the arrangement 16 is evaluated in the decision arrangement 17, 18, 19 by way of the threshold switch 17, the counter 18 and the decision circuit 19. The decision signal (a) available at the output of the decision circuit 19 is evaluated, as represented in FIG. 1 and already explained in the description with reference to the evaluation arrangement 8a in FIG. 1. The measures described with reference to FIG. 2 decidedly improve the detection reliability of the pulse positions and the overall result is an improved initial synchronization of the mobile radio receiver with a base station.

Figure 3:
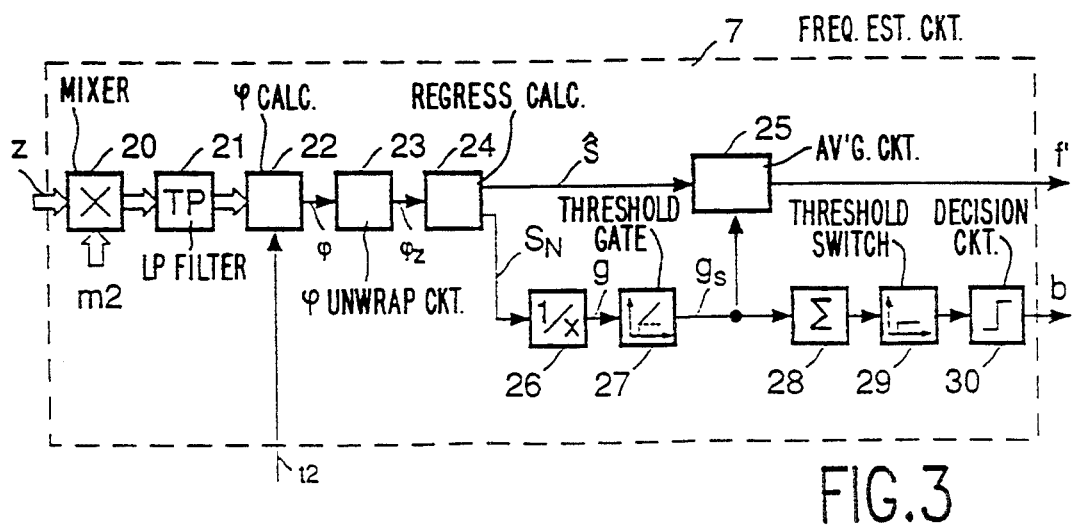
FIG. 3 shows an embodiment of a frequency estimation arrangement of a mobile radio receiver.

FIG. 3 shows an embodiment of a frequency estimation arrangement 7 for the mobile radio receiver 2 shown in FIG. 1. The frequency estimation arrangement is supplied with a signal z that can be derived from the received digital signal e. Subsequently, a band limitation takes place which is performed by an equivalent arrangement comprising a frequency mixer 20 and a succeeding low-pass filter 21. The frequency mixer 20 is supplied with the signal z as well as a second mixing signal m2. After the low-pass filter 21, phase calculation arrangements 22, 23 (Cordic algorithm and phase unwrapping) are provided, the arrangement 22 being supplied with a second clock signal t2. The arrangement 22 produces at its output a signal $\phi$ corresponding to the phase, from which a phase $\phi_z$ with a constant phase variation is calculated in the arrangement 23. The frequency estimation arrangement 7 further includes an arrangement 24 for performing a linear regression calculation like the one that has already been described in the article entitled above-referenced PKI article. At the output of the arrangement 24 for performing the linear regression, signals $\hat{s}$, $S_N$ are available; the signal $\hat{s}$ featuring frequency estimates and the signal $S_N$ featuring the squared distance between the estimated and the real phase variation, so that in the following the reference character $\hat{s}$ is also used for signifying one frequency estimate and the reference character $S_N$ is used for signifying the squared distance. The signal $\hat{s}$ is applied to an averaging circuit 25 at whose output a signal f' is available signifying an average frequency deviation. The signal $S_N$ is applied to a reciprocator 26. At the output of the reciprocator 26 a signal g is available which is used as a quality parameter for expressing the reliability of the frequency estimate in question, which signal will also be referenced quality parameter g in the following. The quality parameter is transported to a threshold gate arrangement 27 which discards values thereof that fall short of a predeterminable threshold. At the output of the arrangement 27 a modified quality parameter $g_s$ is available which is applied to the averaging circuit 25 for a weighted averaging. The modified quality parameter $g_s$ is further applied to a decision arrangement 28, 29, 30 at whose output a second decision signal (b) is available. The decision arrangement 28, 29, 30 comprises a summator 28, a succeeding threshold switch 29 as well as a decision circuit 30.

The digital signal z is processed, up to the determination of the signals g, (b), substantially in the above-referenced the way already described in the above-referenced article. The frequency deviation f' between the local oscillator of the mobile radio receiver and a base station is then determined in the frequency estimation arrangement 7 after the conversion to the baseband and after the possible pulse positions of the occurred frequency control signals have been determined in the recognition arrangement 6. The values not stemming from a frequency correction burst are then discarded. In the phase calculation arrangement 22 there is first a calculation of the main value of the phase of the complex baseband signal z, for example, by means of the CORDIC algorithm. Subsequently, in the arrangement 23 a continuous phase variation $\phi$ is established in that all phase jumps in the calculated phase $\phi_z$ are discarded (phase unwrapping), which phase jumps may be discarded due to the fact that the calculated main value of the phase $\phi_z$ is limited to the range $\pm\pi$, while the searched for phase of the received digital signal shows a continuous variation and may adopt random values. Based on this continuous phase variation the arrangement 24 performs a linear regression to calculate the frequency estimates $\hat{s}$, as this has also been described in the above-referenced PKI article. The frequency estimate $\hat{s}$ may then be calculated in accordance with the following equation:

$$\hat{s} = c \cdot \sum_{m=1}^{M} m[\phi(M + m + 1) - \phi(M - m + 1)];$$

$$M = (N - 1)/2; \quad N \text{ odd}$$

N here denotes the number of measured values per frequency correction burst. The linear regression is only performed for the duration of a frequency correction burst. The initial factor c takes into account the proportional control factor yielded by the selected implementation for calibrating the measured values. Subsequently, in the averaging circuit 25, a weighted averaging is performed of all the frequency estimates $\hat{s}$ available at the output of the arrangement 24, so that at the output of the averaging circuit 25 the following value is produced for the frequency deviation f':

$$f' = \sum_{i=1}^{I} g_s(i) \cdot \hat{s}(i) / \sum_{i=1}^{I} g_s(i);$$

Here I characterizes the number of measurements that have taken place. The result of the weighted averaging is available at the output of the averaging circuit 25 as signal f', which features the frequency deviation between the local oscillator and the oscillator of the base station. For the weighted averaging, each frequency estimate $\hat{s}$ is averaged with a weight that corresponds to the modified quality parameter $g_s$ of the frequency estimation. For determining this quality parameter the arrangement 24 also determines the squared distance $S_N$ of the estimated and real phase variations in addition to the frequency estimates $\hat{s}$. A possible way of calculating $S_N$ is:

$$S_N = N \sum_{n=1}^{N} \phi^2(n) - \left(\sum_{n=1}^{N} \phi(n)\right)^2 - \frac{1}{c^2} \frac{12}{N^2 - 1} (\hat{s})^2.$$

In the reciprocator 26 the reciprocated value of the squared distance $S_N$ is calculated. In this manner the quality parameter g is obtained to judge the reliability of the frequency estimate concerned. Not until this quality parameter g or the modified quality parameter $g_s$ for weighted averaging in the averaging circuit 25 has increased will the required accuracy for determining the frequency deviation f' under conditions of fading be obtained. A second improvement of the frequency determination is achieved when the quality parameter g is modified by a suitably selected threshold in the arrangement 27 before being averaged. All values falling short of this threshold are then zeroed. As denoted in FIG. 3, the quality parameter g can also be utilized as a second decision signal (b) with the aid of the decision arrangement 28, 29, 30 which operates in corresponding fashion to the decision arrangement described with respect to FIG. 2. The decision signal (b) is also used for determining/detecting the frequency correction burst, and to form, similar to signal (a) in FIG. 2, a second decision signal for deciding on whether a frequency correction burst has been found or not. For producing the decision signal (b) all determined modified quality parameters are added together in summator 28. The output signal of the summator 28 is applied to the threshold switch 29 and the succeeding decision circuit 30.

I claim:

1. A mobile radio receiver for use in a radio transmission system wherein a transmitted radio signal comprises a carrier wave modulated in accordance with a transmitted digital signal which periodically includes, at a predetermined frequency, a frequency correction burst in the form a series of pulses; the frequency of the pulses in said frequency correction burst signifying a frequency deviation from the frequency of said carrier wave; said receiver comprising:

radio frequency receiving means for receiving the transmitted radio signal and, by mixing with a local oscillator signal and further processing, deriving a digital signal from the transmitted radio signal;

recognition circuit means coupled to said radio frequency receiving means to receive the derived digital signal therefrom and, during successive observation intervals, to (i) search the derived digital signal to detect pulses therein of said frequency correction burst and produce a time signal (t) indicative of the time positions of said pulses, and (ii) derive from the time signal (t) a time position signal (T) indicative of the time position of said frequency correction burst in said derived digital signal;

frequency estimating circuit means coupled to said radio frequency receiving means to receive the derived digital signal and, during each of said observation intervals, produce therefrom a frequency deviation signal (f') indicative of an estimated value of said frequency deviation; and control means coupled to said recognition circuit means and to said frequency estimating circuit means for receiving said time position signal (T) and said frequency deviation signal (f') and producing therefrom a control signal for application to said radio receiving means to control the frequency of said local oscillator signal so as to track the frequency of said carrier wave;

said receiver being characterized in that said recognition circuit means comprises:

pulse height detecting means for producing a pulse height signal ($U_s$) indicative of the heights of pulses in the derived digital signal which exceed a predetermined threshold height;

averaging means for averaging the pulse time positions indicated by the time signal (t) weighted in accordance with the pulse heights indicated by the pulse height signal ($U_s$), the weighted average so derived constituting said time position signal (T); and first validation circuit means for receiving the pulse height signal ($U_s$), determining therefrom the number of pulses in a predetermined plurality of said observation intervals which exceed said predetermined threshold height, and producing a first validation signal (a) indicative of whether said time position signal (T) actually relates to a frequency correction burst included in the derived digital signal.

2. A mobile radio receiver as claimed in claim 1, wherein at least one of said recognition circuit means and said frequency estimating circuit means comprises at least one of a bandpass filter for the derived digital signal and a frequency mixer for mixing the derived digital signal with a local mixing signal, in each case followed by a lowpass filter having a linear phase shift as a function of frequency.

3. A mobile radio receiver as claimed in claim 1, wherein said frequency estimating circuit means comprises: means for producing from the derived digital signal a phase error quality parameter ($g_s$) relating to phase error between the derived digital signal and an estimated value of said frequency deviation; and averaging means for averaging successive estimated values of said frequency deviation weighted in accordance with applicable values of said phase error quality parameter ($g_s$).

4. A mobile radio receiver as claimed in claim 1, wherein said frequency estimating circuit means comprises second validation circuit means for receiving said phase error quality parameter for successive observation intervals, determining whether said parameters conform to a predetermined decision criterion applicable to a frequency correction burst, and producing a second validation signal (b) indicative of whether said frequency deviation signal (f') actually relates to a frequency correction burst included in the derived digital signal.

5. A mobile radio receiver as claimed in claim 3, wherein said frequency estimating circuit means comprises second validation circuit means for receiving said phase error quality parameter for successive observation intervals, determining whether said parameters conform to a predetermined decision criterion applicable to a frequency correction burst, and producing a second validation signal (b) indicative of whether said frequency deviation signal (f') actually relates to a frequency correction burst included in the derived digital signal.

6. A mobile radio receiver as claimed in claim 5, further comprising evaluation circuit means coupled to said first and second validation circuit means to receive the first and second validation signals (a) and (b) and producing therefrom an evaluation signal for application to said control means to provide further assurance that the frequency of said local oscillator signal tracks the frequency of said carrier wave.

7. A mobile radio receiver as claimed in claim 3, wherein said means for deriving said phase error quality parameter ($g_s$) comprises means for deriving the reciprocal of the square of the distance ($S_N$) between an estimated phase variance and an actual phase variance between said carrier wave and said estimated frequency deviation signal (f').

* * * * *